United States Patent

Tkacenko

[15] 3,652,787

[45] Mar. 28, 1972

[54] TELEVISION SIGNAL COLOR CORRECTOR

[72] Inventor: Katarina Tkacenko, 2305 East 2nd St., Bloomington, Ind. 47401

[22] Filed: Nov. 12, 1970

[21] Appl. No.: 88,727

[52] U.S. Cl. ..........178/5.4 R, 178/57 A

[51] Int. Cl. ..........H04n 9/00

[58] Field of Search..........178/5.4, 5.2 A, 5.4 HE

[56] References Cited

UNITED STATES PATENTS

| | | | |
|---|---|---|---|
| 3,461,224 | 8/1969 | McMann | 178/5.4 R |
| 3,548,083 | 12/1970 | Cahen | 178/5.4 R |
| 3,355,984 | 12/1967 | Puschmann | 178/5.4 R |

*Primary Examiner*—Robert L. Griffin
*Assistant Examiner*—Richard P. Lange
*Attorney*—Woodard, Weikart, Emhardt & Naughton

[57] ABSTRACT

A television signal color corrector operable to correct the signal without demodulation. A pulse extractor, subcarrier regenerator, chroma filter, multiplier and output summing stage are connected together to receive the incoming encoded composite color signal. The pulse extractor provides a burst flag pulse to the subcarrier regenerator which has six outputs corresponding to the phase of color chrominance of red, blue, green and their complementaries. Center clippers are connected to the outputs of the regenerator and remove the center portion of the subcarrier regenerator output signals. Three potentiometers receive the outputs from the center clippers and allow adjustment of the red, blue and green signals. A summing stage is connected to the three potentiometers and receives a blanking pulse from the pulse extractor and provides the correcting color signal to an electronic multiplier connected to the output of the chroma filter. The output of the multiplier is fed to an output summing stage which provides the corrected signal. Two potentiometers connected each between two of the subcarrier regenerator outputs are adjustable to provide a black balance signal which is fed to the output summing stage. A gamma compressor may be connected between a black balance summing circuit and the output summing stage.

5 Claims, 4 Drawing Figures

PATENTED MAR 28 1972 3,652,787

INVENTOR
Katarina Tkacenko
By
Woodard, Weikart,
Emhardt & Naughton
Attorneys

TELEVISION SIGNAL COLOR CORRECTOR

BACKGROUND OF THE INVENTION

1. Field of the Invention

This invention is in the field of color correctors for adjusting a color television signal.

2. Description of the Prior Art

The color information in the broadcasted television signal varies from program to program. This is true because many programs originate in different studios which have different cameras and different lighting. As a result, it is sometimes necessary to adjust the television receiver for correct color whenever the television program changes. Circuitry has been devised to allow the color signal to be adjusted at the studio or broadcast area in order to broadcast a uniform color signal. These prior art devices typically demodulate the color signal, correct the demodulated signal and then remodulate the signal for broadcast. A device of interest in this field is disclosed in the U.S. Pat. No. 3,461,244 issued to McMann.

The present invention allows for correction of the broadcast color signal without requiring the normal demodulation and remodulation steps. The device may be operated in the studio or boradcast area and has adjustments for the red, blue and green colors.

SUMMARY OF THE INVENTION

This invention is a color corrector for use in correcting a composite television color signal which is to be transmitted. A pulse extractor is connected to an input line which receives the encoded signal. A subcarrier regenerator also connected to the input line receives a burst flag pulse from the pulse extractor and provides six outputs corresponding to the red, blue and green phase signals. Center clippers connected to each regenerator output allow the maximum and minimum peaks of the color signals to pass to potentiometers. One potentiometer is connected to the two center clippers corresponding to the clipped red signal. A second potentiometer is connected to the center clippers corresponding to the clipped blue signal and a third potentiometer is connected to the two center clippers corresponding to the clipped green signal. A summing stage receives the outputs of the three potentiometers and feeds the resultant correcting signal to a multiplier connected to the input line via a chroma filter. The output of the multiplier is fed to an output summing stage. Two additional potentiometers each connected to a pair of regenerator outputs provide black balance correcting signals which are summed and fed to the output summing stage. A gamma compressor may be connected between the black balance correcting circuitry, the output summing stage and the input line.

It is an object of the present invention to provide a device for adjustment of color variation in a television composite signal without requiring the normal steps of demodulation and remodulation of the color signal.

It is a further object of the present invention to provide a device for allowing color adjustment at the broadcast area quickly and at a relatively low cost.

In conjunction with the previous objects, it is an object of the present invention to provide a new and improved device for preventing color variation in a television color signal as a result of changes in studio cameras and lighting.

Related objects and advantages of the present invention will be apparent from the following description.

DESCRIPTION OF THE PREFERRED EMBODIMENT

Figure 1:
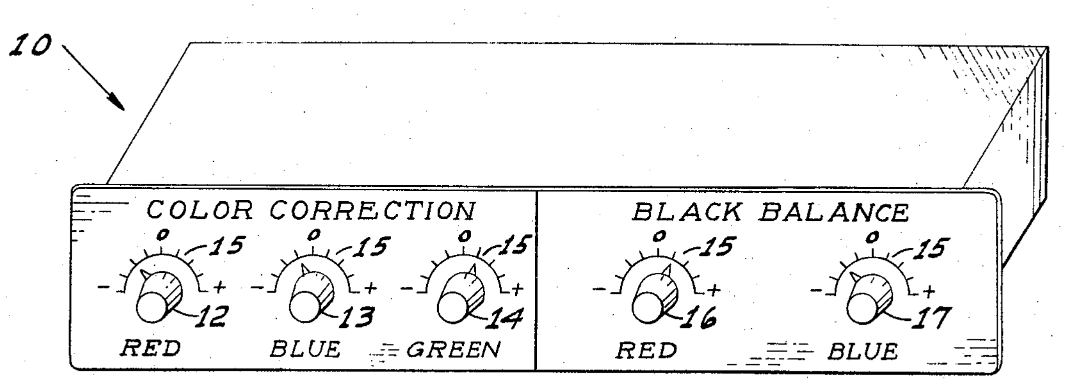
FIG. 1 is a perspective view of a television color corrector incorporating the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is illustrated a television color corrector 10 for correcting unwanted color variations in television signals which occur as a result of utilization of variable studio lighting and multiple studio cameras. Color corrector 10 is packaged in a conventional rack mounted container 11 and has rotatable knobs 12, 13 and 14 for studio adjustment of colors red, blue and green and 16 and 17 for the black balance. Suitable markings 15 are provided on the front surface of container 11 around each knob providing a relative standard.

Figures 2, 3, 4:
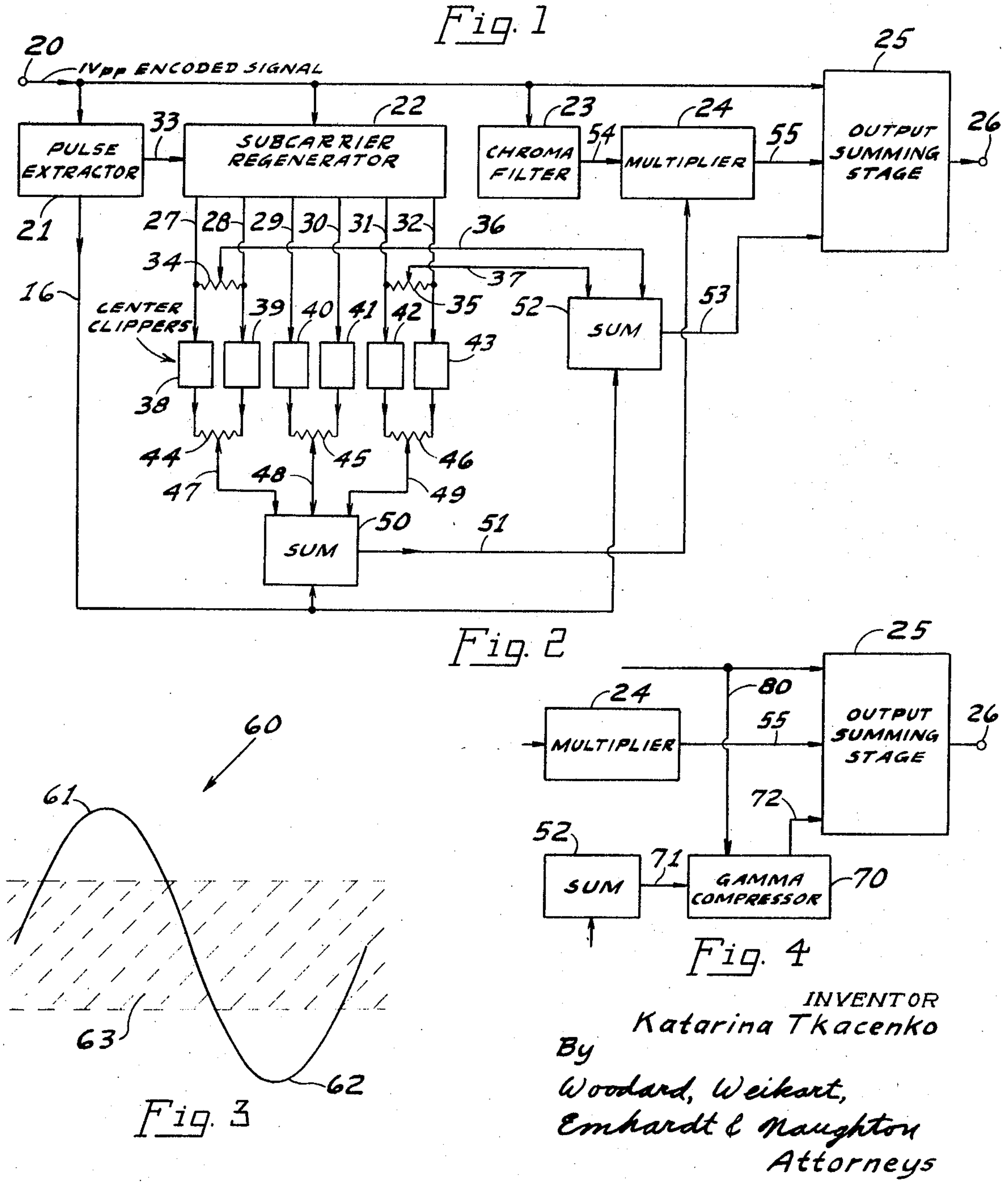
FIG. 2 is a block schematic of the electrical circuitry of the color corrector shown in FIG. 1.
FIG. 3 is an illustration of a typical output signal existing at the subcarrier regenerator outputs 27 through 32 shown in FIG. 2.
FIG. 4 shows a portion of the block schematic of FIG. 2 with a gamma compressor added between blocks 52 and 25.

FIG. 2 is a block schematic of the electrical circuitry required for color corrector 10. The required electronic functions of the blocks shown in FIG. 2 can be realized either through discrete component techniques or by integrated circuits. The composite encoded color signal is applied to input terminal 20 which is directly connected to pulse extractor 21, subcarrier regenerator 22, chroma filter 23 and output summing stage 25. The subcarrier regenerator is the type of circuit found in every color television receiver usually (not always) consisting of the form of burst flag gate, phase discriminator and phase locked crystal oscillator that gives constant sine wave output at different desired phases. The input color signal contains luminance, chrominance, sync and color burst information. This input signal is simultaneously fed to pulse extractor 21, subcarrier regenerator 22, chroma filter 23 and output summing stage 25. Pulse extractor 21 is connected to subcarrier regenerator 22 by line 33 and to summing stage 50 and 52 via line 16. The pulse extractor extracts sync and uses it to generate burst flag pulses which are provided to subcarrier regenerator 22. The burst flag pulses act as gate pulses for subcarrier regenerator 22 to allow passage of color burst information from the encoded signal from terminal 22. Subcarrier regenerator 22 is a 3.58 MHz regenerator unless the color corrector is to be utilized with the European color PAL television system. In this latter case, a 4.43 MHz regenerator should be utilized in lieu of the 3.58 MHz regenerator. Regenerator 22 has six output lines 27, 28, 29, 30, 31 and 32 each having a different phased 3.58 MHz signal. Lines 27 and 28 have respectively the two phases (for example, positive and negative phases) corresponding to red chrominance; whereas, lines 29 and 30 have respectively the positive and negative phases corresponding to green chrominance. Likewise, lines 31 and 32 have respectively positive and negative phases corresponding to blue chrominance. Lines 27 through 32 are respectively connected to center clippers 38, 39, 40, 41, 42 and 43. FIG. 3 is an illustration of the typical sine output signal existing on lines 27 through 32. Each center clipper removes approximately the center one-half portion 63 of signal 60 leaving the maximum and minimum peaks 61 and 62 to pass out the output of the center clipper. These maximum and minimum peaks 61 and 62 are then fed to three color correcting potentiometers 44, 45 and 46. Potentiometer 44 is connected across the outputs of clippers 38 and 39 and have a variable leg 47 connected to knob 12 (FIG. 1) for red chrominance adjustment. Likewise, potentiometers 45 and 46 are respectively connected across the output of clippers 40, 41, 42 and 43. The variable legs 48 and 49 of potentiometers 45 and 46 are respectively connected to knobs 14 and 13 for controlling the adjustment of green and blue chrominance. Each separate output signal on legs 47, 48 and 49 may be zero, positive (one phase) or negative (opposite phase). The three signals on legs 47, 48 and 49 are fed to summing stage 50. The output signal of summing stage 50 on line 51 represents the total desired correction and is fed to the electronic multiplier 24 which electronically multiplies the chrominance signal from chroma filter 23 with the combined correcting signal from summing stage 50. The multiplier is of the type usually known as analog multiplier and gives at its output the amplitude product of two electrical magnitudes applied at its inputs. As example, the integrated circuit by Motorola Corporation type MC 1495. The chroma signal from chroma filter 23 is provided via line 54 to multiplier 24. Line 55 then provides the multiplied signal to output summing stage 25. If the three color correcting potentiometers 44, 45 and 46 are all adjusted to zero, no correcting signal appears at the output of the multiplier since one of the multiplicands is zero. Thus, the original composite color signal passes out the output summing stage 25 via terminal 26 without change except for black balance correction which also can be zero.

If the correcting signal contains, for example, positive red and no green or blue component, then the signal will produce certain amplitude in phase of only red signal which within the output summing stage adds to the original red signal boosting it. A similar analysis is valid for negative red in which case it subtracts from the original red signal reducing it. The same is true for the other two colors.

Connected between lines 27 and 28 is black balance potentiometer 34 having a variable leg 36 connected to black balance summing stage 52. An additional black balance potentiometer 35 is connected between lines 31 and 32 having a variable leg 37 also connected to black balance summing stage 52 which in turn is connected to output summing stage 25 via line 53. A third black balance potentiometer may be connected between the green phase lines 29 and 30; however, this third potentiometer is unnecessary since the output provided is also contained within the red and blue potentiometers 34 and 35. Both the black balance and chroma correcting signals are blanked by the pulse from pulse extractor 21 via line 16 in order that false correction does not occur during the burst and blanking interval.

FIG. 4 is a block schematic of additional electrical circuitry which may be added to the circuitry shown in FIG. 2 if desired. The circuitry of FIG. 4 however is not necessary to the operation of the present invention. The black balance signals from summing stage 52 may be fed to a gamma compressor 70 by line 71 in lieu of to the output summing stage 25 via line 53. Gamma compressor 70 receives the encoded signal via line 80 and provides the black balance correction to stage 25 in line 72. The compressor is a luminance controlled compressor of the logarithmic amplifier type which will introduce maximum black correction at low level of video (black) and almost no correction at high level of video (white).

The color corrector of FIG. 1 may be connected to a standard studio television camera or at a nearby location so as to allow a studio man to view the main monitor and adjust the color by knobs 12, 13 and 14. In addition, a standard vectorscope may be used to accurately determine the best color. The color would be adjusted whenever the color changed as a result of different lighting or different cameras. It will be determined from the above description that the present invention provides a device and method for the adjustment of color variation in a television composite signal without requiring the normal steps of demodulation, correction and remodulation of the color signal. In addition, it will be determined that the device and method allows color adjustment at the broadcast area quickly and at a relatively low cost. The new device will prevent color variation in the television broadcast signal as a result of changes in studio cameras and lighting.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A television signal color corrector comprising:
input means receiving the uncorrected composite encoded color signal;
a pulse extractor connected to said input means and having a blanking pulse output and a burst flag pulse output;
a subcarrier regenerator connected to said input means and to said burst flag pulse output, said subcarrier regenerator has a first output with a first red chrominance phase signal thereon, a second output with a second red chrominance phase signal opposite to said first red phase signal, a third output with a first blue chrominance phase signal thereon, a fourth output with a second blue chrominance phase signal opposite to said first blue phase signal, a fifth output with a first green chrominance phase signal thereon, and a sixth output with a second green chrominance phase signal opposite to said first green phase signal;
center clippers connected to said outputs of said subcarrier regenerator;
first adjustment means connected to said clippers operable to combine said red, blue and green chrominance signals;
second adjustment means connected to said outputs of said subcarrier regenerator having a black balance correction output; for combining the output of at least two of said red, blue and green chrominance signals;
a multiplier connected to said first adjustment means; and,
a first output summing stage connected to said multiplier for combining said uncorrected composite encoded color signal with the combined multiplier signal and the black balance correction signal of said second adjustment means.

2. The corrector of claim 1 additionally comprising:
a chroma filter connected to and between said input means and said multiplier.

3. The corrector of claim 2 wherein:
one each of said center clippers are connected to one each of said outputs of said subcarrier regenerator;
said first adjustment means has a first potentiometer connected to two of said clippers, a second potentiometer connected to two of said clippers and a third potentiometer connected to two of said clippers, said first adjustment means has a second summing stage connected to the outputs of said potentiometers, said blanking pulse output of said pulse extractor and to said multiplier.

4. The corrector of claim 3 wherein:
said second adjustment means is a fourth potentiometer connected to two of said outputs of said subcarrier regenerator and a fifth potentiometer connected to two of said outputs of said subcarrier regenerator, said second adjustment means has a third summing stage connected to said fourth and fifth potentiometers and to said first output summing stage.

5. The corrector of claim 4 additionally comprising:
a gamma compressor connected to and between said third stage and said first stage and to and between said input means and said first stage.

* * * * *